United States Patent [19]
Tanaka et al.

[11] 3,935,933
[45] Feb. 3, 1976

[54] AUTOMATIC ARTICLE VENDING MACHINE

[75] Inventors: Toshio Tanaka, Kyoto; Mamoru Hirayama, Takatsuki; Noriaki Minami, Osaka, all of Japan

[73] Assignee: Omron Tateisi Electronics Co., Ltd., Kyoto, Japan

[22] Filed: July 1, 1974

[21] Appl. No.: 484,597

[30] Foreign Application Priority Data
July 5, 1973 Japan................................ 48-76732

[52] U.S. Cl...... 194/4 R; 194/DIG. 26; 235/61.7 B;
235/61.8 A; 235/61.12 M; 340/149 A
[51] Int. Cl.²......................... G07F 1/06; G07F 7/02
[58] Field of Search....... 194/4 R, 4 C, 4 D, DIG. 6,
194/DIG. 9, 4 B, 4 F; 221/2; 222/2; 340/147
A, 149 A; 235/61.7 B, 61.8 A, 61.12 M

[56] References Cited
UNITED STATES PATENTS
3,356,021  12/1967  May et al....................... 235/61.8 A
3,578,124  5/1971  Flum.................................. 194/4 R
3,602,695  8/1971  Boss.............................. 194/4 R X
3,761,682  9/1973  Barnes et al................. 340/149 A X

*Primary Examiner*—Stanley H. Tollberg
*Assistant Examiner*—Joseph J. Rolla
*Attorney, Agent, or Firm*—Christensen, O'Connor, Garrison & Havelka

[57] ABSTRACT

An automatic article vending system in which a card is used to actuate the system. The card has a predetermined monetary value, which is decreased by the value of the article purchased with the card. A predetermined maximum value that can be spent at one time is set for the card. It is possible to purchase with the card an article having a value within the lower one of the present value of the card and the maximum spendable value. The card may be given an extra value added gratis to the value of the money paid by the owner of the card.

12 Claims, 5 Drawing Figures

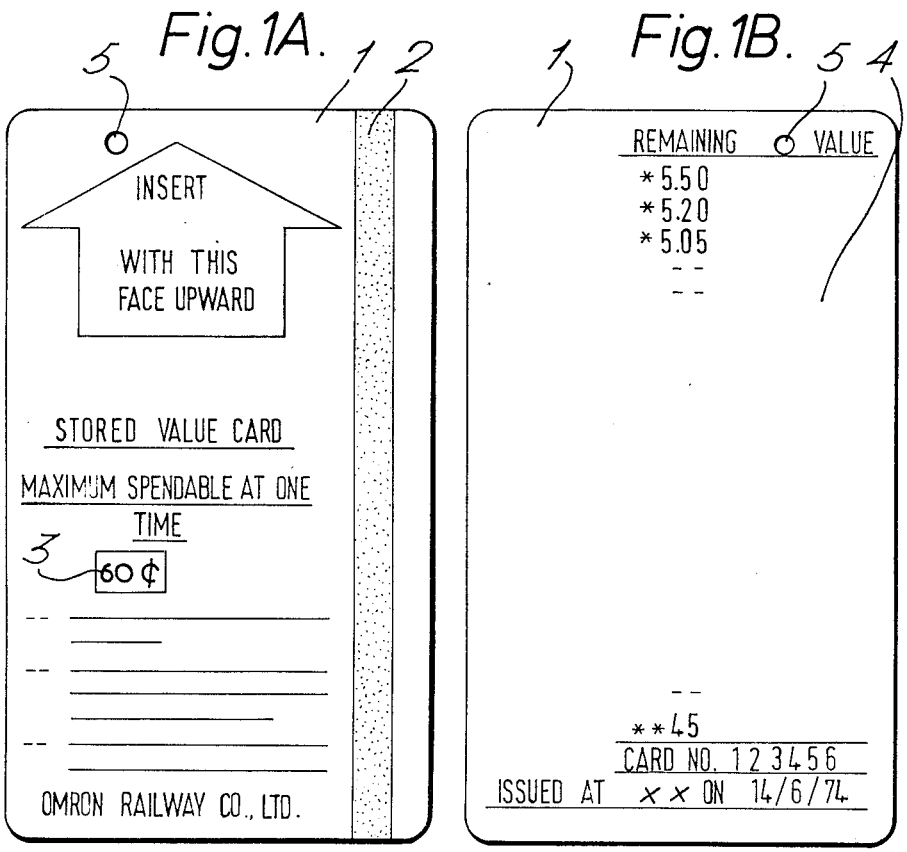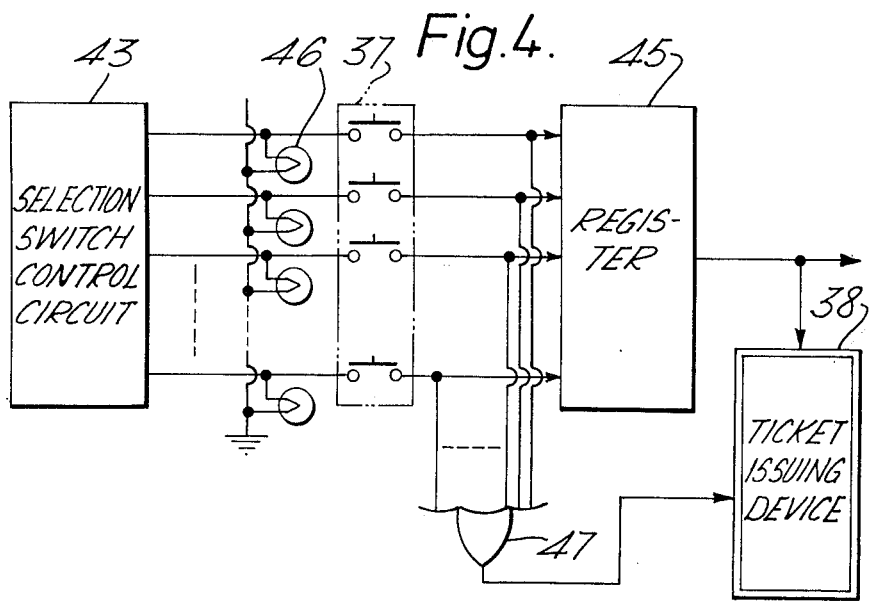

AUTOMATIC ARTICLE VENDING MACHINE

This invention relates to an automatic article vending system in which a card is used to actuate the operation of the system.

In the card-actuated automatic vending system with which the invention is concerned, a "stored value card" is used on which various data such as the monetary value given to the card are recorded in both machine-readable and human-readable forms. When the card is used in the system to purchase an article therefrom, the price or value of the article purchased is subtracted from the value stored on the card, and the result of the subtraction is recorded on the card in place of the previously recorded value.

The card is issued to a customer in exchange for a certain amount of money paid by the customer. The card is given the value of the money paid, to which in some cases an extra value is added gratis on condition that the card is to be used in a particular vending machine.

Suppose that the extra value to be added gratis is 10 percent of the value actually paid. If the customer has paid $ 5, the card will be given the value of $ 5.5.

If all the value of the card has been spent within a short period of time, it will be unprofitable to the person who issued the card. In the above example, if the owner of the card having the value of $ 5.5 has spent all the value of $ 5.5 in one day, the gratis value must be borne at the rate of 50 cents per day, which is a considerably high rate.

However, if the owner of the card is allowed to spend only 50 cents per day, at least eleven days are required to spend the whole value of $ 5.5. In this case the gratis value of 50 cents is borne at the rate of 50 cents per eleven days, which is considerably lower than the previous rate of 50 cents per day.

Therefore it is desirable to restrict the use of the card by, e.g., predetermining the maximum value that can be spent at one time. It would be most desirable to set the maximum value that can be spent in one day. To this end, however, it would be required to record on the card the date on which the card is used and set the present date in the vending machine every day and compare the date set in the machine and the date read from the card used in the machine. This would require additional devices and control circuits, with resulting complication of the design and construction of the machine.

In order to set the maximum value that can be spent at one time, this maximum value is recorded on the card. The maximum value that can be spent at one time will be referred to as the maximum spendable value hereinafter. When the card is used in the machine, it is necessary to control the machine so that only an article having a lower value than the maximum spendable value can be purchased from the machine. However, when the remaining value of the card is less than the maximum spendable value, if an article having the maximum spendable value is vended, it would cause a loss to the owner of the vending machine.

Accordingly, the primary object of the invention is to provide an automatic vending system which is actuated by a stored value card, and wherein the card has recorded thereon the maximum value that can be spent at one time, and when the card is used in the system the remaining stored value of the card and the maximum spendable value are compared so as to permit vending of an article only within the lower one of the two values. In other words, if the remaining stored value of the card is greater than the maximum spendable value, an article within the maximum spendable value is sold, while if the remaining stored value is smaller than the maximum spendable value, an article within the remaining stored value is sold.

In one embodiment of the invention, the card has visibly recorded thereon the maximum spendable value so that the owner of the card can easily see the maximum value he can spend with the card at one time. Also the card has visibly recorded thereon a series of remaining values resulting from each purchase so that the owner of the card can easily see the value the card has at present.

In addition to the visible records, these values are recorded machine-readably, e.g., magnetically on the card. The magnetic record of the remaining stored value is rewritten at each purchase.

When the card is used in the vending machine, the magnetically recorded data are read and compared. If the maximum spendable value is smaller than the remaining stored value of the card, an article selection switch control circuit operates so as to permit vending of an article within the maximum spendable value. If the maximum spendable value is greater than the remaining stored value of the card, the control circuit operates so as to permit vending of an article within the remaining stored value of the card.

The vending machine is provided on, say, its front panel with an article selection switch board including a plurality of switches corresponding to different values or prices of articles on sale. The switch board is manipulated by purchasers. When the article selection switch control circuit operates in the above-mentioned manner, it renders operable those of the article selection switches which correspond to the articles the values of which are within the lower one of the maximum spendable value and the remaining stored value of the card used. When the customer presses one of those operable switches, the machine dispenses an article corresponding to the pressed switch.

At the same time, the value of the article vended is subtracted from the value which the card then has, so that the result of subtraction is recorded on the card visibly in addition to the previous visible records and also magnetically in place of the previous magnetic record. The card is then returned to its owner.

The invention will be more clearly understood by reading the following detailed description of one embodiment thereof with reference to the accompanying drawings, wherein:

FIGS. 1A and 1B show the opposite side surfaces of a stored value card used in the automatic vending machine of the invention;

FIG. 4 is a detailed diagram of a portion of FIG. 3.

Figure 2:
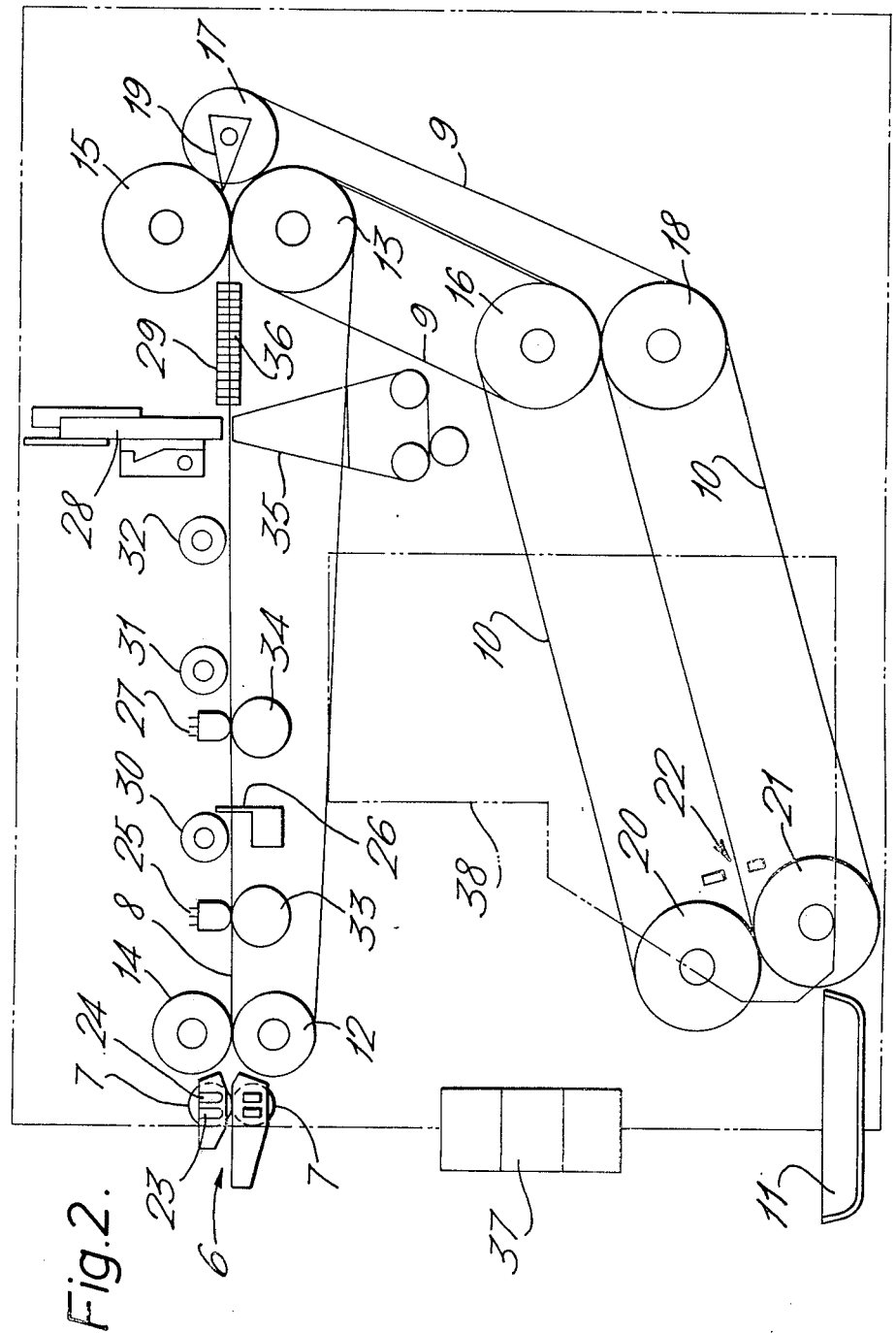
FIG. 2 is a schematic side view of the interior mechanism of the vending machine.

The invention will be described as applied to an automatic railway ticket vending machine which vends railway tickets which can be used for a single ride on a train.

Referring in detail to the drawings, there is shown in FIG. 1 a stored value card 1 used in the system of the invention. The obverse and reverse sides of the card are indicated by A and B, respectively.

On the obverse side A the card has a magnetic stripe 2, on which various coded informations are magnetically recorded such as: the monetary value that can be spent with the card, that is, the sum of the fare which the owner of the card has paid to obtain the card and an extra value that has been added gratis or free of charge at a predetermined rate set for the fare paid; the maximum value that can be spent at one time; the card number; the date of issue; the code number of the office where the card was issued; and the like.

The card also has on its obverse side an area 3 where the maximum value that can be spent at one time, that is, the maximum spendable value is printed in visible figures. These figures are printed when the card is issued. Other visible informations such as an indication of which end of the card is to be inserted into the machine are also given on the obverse side of the card as at 3a.

On the reverse side B the card has an area 4 where the remaining values of the card are printed in visible figures. On the top end of the area the value that can be spent with the card, that is, the sum of the fare paid and the extra value added gratis is printed in visible figures. This value will be referred to as "the initial stored value"; and the value the card now has will be referred to as "the remaining value" or "the stored value."

Each time the card is used, the value of the article purchased is subtracted from the stored value of the card, and the result of the subtraction, that is, the remaining value is recorded in the stripe 2 and the area 4.

The card is provided with a hole 5 at the forward edge portion and at one side of the center line thereof. The hole is detected by a photoelectric switch in an automatic vending machine so as to determine whether the card has been introduced into the machine in the required direction and also with its obverse and reverse sides held properly.

FIG. 2 somewhat schematically shows the interior mechanism of an automatic ticket vending machine in which the card 1 can be used to purchase a ticket that can be used only once.

The card 1 is inserted through an inlet 6 into the machine. The inserted card is pulled inwardly by a pair of upper and lower rollers 7 and 7 onto a conveyor belt 8. As the card is conveyed by the belt 8, reading, recording and printing of required informations are conducted. After the required treatment is finished, the card is conveyed by a pair of conveyor belts 9, 9 and then 10, 10 onto an outlet tray 11.

The above-mentioned conveyor belt 8 runs around a spaced pair of pulleys 12 and 13, with guide rollers 14 and 15 resting on the pulleys 12 and 13 at the starting and terminating ends of the span of the belt, respectively.

The belts 9, 9 run around the pulleys 13 and 16, and 17 and 18, respectively. A pulley 17 is provided intermediate the roller 15 and the pulley 13 so as to direct the card downwardly.

The pulley 17 is provided with a deflecting member 19 the forward edge of which is tiltable up and down. When the card has been found invalid, the edge of the member 19 is tilted downward so as to deflect the card upward.

The belts 10 and 10 run around the pulleys 16 and 20, and 18 and 21, respectively. At the front end of the belts 10 there is provided a photoelectric detector 22 which detects the card having passed onto the tray 11 to be returned to the owner.

Inside the card inlet 6 there are provided a pair of detectors 22 and 23. The former detector 22 detects the card introduced and produces a signal to actuate a ticket issuing device not shown in FIG. 2 but provided in the machine, and the latter detector 23 detects the hole 5 in the card so as to check if the card has been introduced in the proper direction. Both the detectors comprise a photoelectric switch.

On the upper side of the conveyor belt 8 there are provided along the direction of movement of the belt a magnetic reading head 25, a first stopper 26, a magnetic writing head 27, a dot printer 28, a second stopper 29, and guide rollers 30, 31 and 32 in wide spaces therebetween.

Pressure rollers 33 and 34 are urged against the heads 25 and 27, respectively, from the undersides thereof for good contact of the card with the heads 25 and 27.

The reading head 25 reads the card information recorded in the stripe 2, that is, the stored value, the maximum spendable value, etc.

The writing head 27 writes on the card stripe the remaining value in machine-readable code after a ticket has been purchased.

The dot printer 28 prints the remaining value in human-readable figures in the area 4 of the card. To this end the dot printer 28 is designed to be laterally displaceable relative to the card so as to enable printing in the right or left column of the area 4.

An ink ribbon 35 is provided to face the dot printer 28, and the card passes between the printer 28 and the ribbon 35, with its reverse surface facing the ink ribbon.

The second stopper 29 defines the position or the line where the new remaining monetary value is to be printed on the basis of the position of the line where the previous value was printed. The stopper comprises a plurality of pins 36 the number of which corresponds to the number of the lines or rows in the card area 4 in which the remaining monetary value is to be printed, and the position at which the card is stopped by each of the pins 36 corresponds to one of the lines in which the monetary value is to be printed.

Thus the dot printer 28 selects the right or left side or column of the area 4 and the stopper determines the line where the printing is to be performed.

A selection switch board 37 comprises a plurality of push-button switches corresponding to the different fares of the tickets on sale.

A ticket issuing device 38 issues a ticket in accordance with the kind of the push-button pressed by the customer, and the ticket is delivered onto the tray 11.

The previously mentioned stopper 26 is actuated by a solenoid so as to be selectively projected above the conveyer belt 8 and withdrawn below the belt. When projected above the belt 8, the stopper temporarily stops the movement of the card 1 on the belt.

Figure 3:
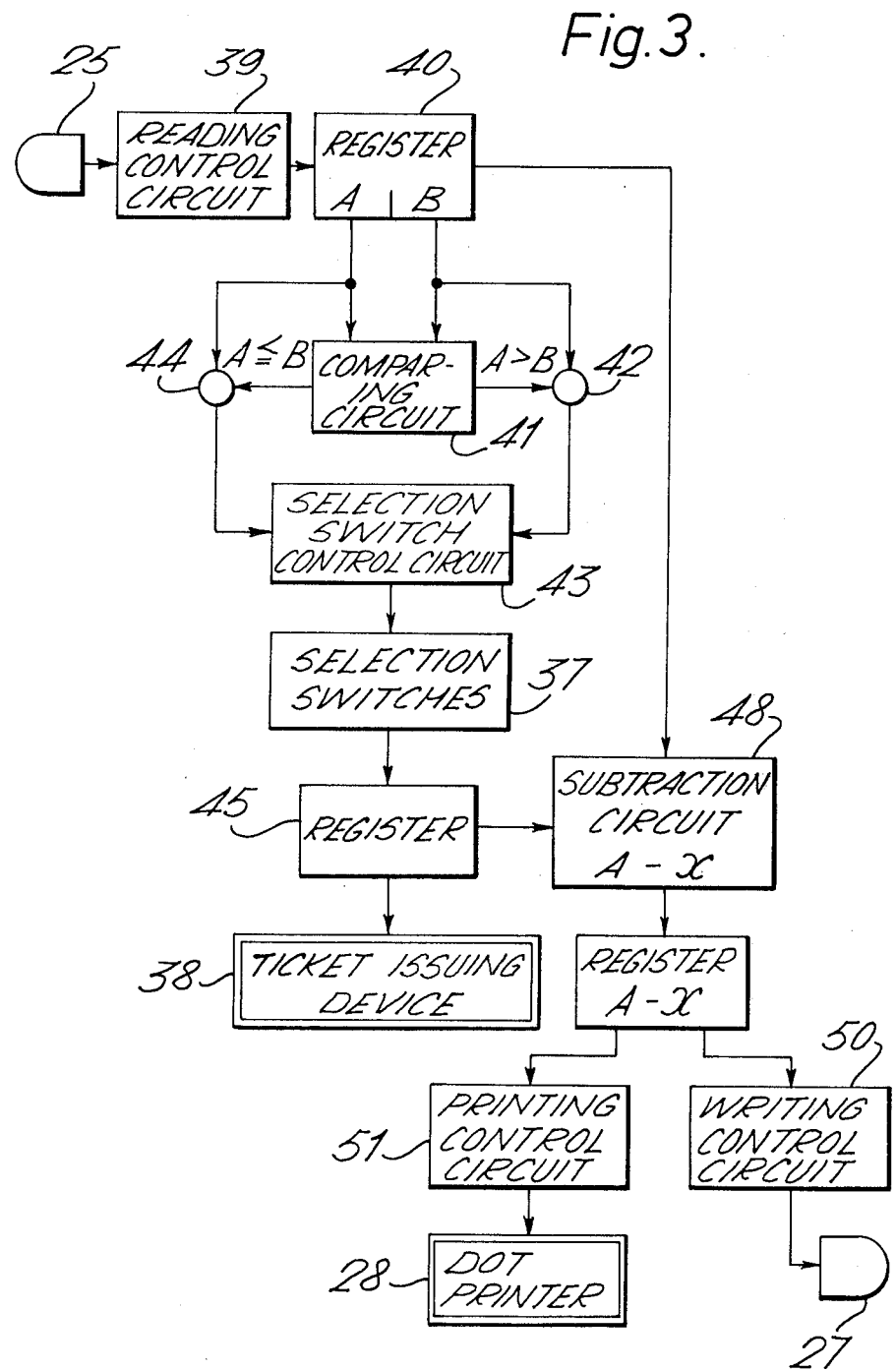
FIG. 3 is a block diagram of the electrical control circuit of the machine.

FIG. 3 shows a block diagram of the control circuit of the machine of the invention. The remaining value A of the card and the maximum spendable value B read by the reading head 25 are stored in a register 40 through a reading control circuit 39. The values stored in the register are applied to a comparing circuit 41 where the two values are compared. If the value A is greater than the value B, a gate 42 is opened to apply a signal to a ticket selection switch control circuit 43 to condition the switch board so that a ticket within the maximum value B will be issued. If the value A is smaller than or equal to the value B, a gate 42 is opened to apply a signal to the control circuit 43 to condition the switch board so that a ticket within the value A will be issued.

In the selection switch board 37 only those of the switches which have been controlled by control circuit 43 are operable, and when one of the operable switches is pressed by the purchaser, the value of the pressed switch is stored in a register 45 and on the basis of the stored information a ticket issuing device 38 issues a corresponding ticket.

FIG. 4 is a block diagram showing in further detail the above-mentioned control circuit 43, the selection switches 37, the register 45 and the ticket issuing device 38. As shown, the control circuit impresses a source voltage to only those of the switches 37 which have been rendered operable and those of the lamps 46 which correspond to the operable switches 37 are lighted so as to indicate to the customer that the corresponding switches only are operable.

The output from each of the switches 37 is applied to an OR element 47, the output of which is applied to the ticket issuing device 38 so as to render the device operable, and on the basis of the signal from the pressed switch 37 as stored in the register 45 the ticket issuing device 38 starts ticket issuing operation.

Returning to FIG. 3, the signal X from the pressed switch 37 as stored in the register 45 (which represents the monetary value or fare of the ticket to be purchased) is coded and applied to a subtraction circuit 48, which subtracts the value X from the above-mentioned remaining value A of the card as stored in the register 40 for calculation of the new remaining value of the card. The result of the subtraction is stored in a register 49.

A writing control circuit 50 controls the writing head 27 so that the head magnetically records the value (A–X) on the stripe 2 of the card, while a printing control circuit 51 controls the dot printer 28 so that the printer prints the value (A–X) in the area 4 in visible figures.

Suppose, for example, that the customer has paid $ 5. If an extra value of 50 cents has been added to $ 5, the card issued will have the stored value of $ 5.5, with the maximum spendable value having been set to 60 cents.

When the above card is inserted into the inlet 6 of the machine, the detector 23 detects the card and the detector 24 checks if the card has been inserted in the proper direction. The reading head 25 reads the value of $ 5.5 that can be spent with the card and the maximum spendable value of 60 cents from the card which has been temporarily stopped by the stopper 26. The data read are stored in the register 40.

The comparing circuit 41 compares the values of $ 5.5 and 60 cents, and since the value of $ 5.5 is greater than the value of 60 cents, the gate 42 is opened to apply a signal to the selection switch control circuit 43 so that a ticket within the value of 60 cents can be purchased.

When the remaining value of the card has become less than 60 cents, for example, 40 cents after the card has been used many times, the gate 44 is opened to apply a signal to the selection switch control circuit 43 so that a ticket within 40 cents can be purchased. Only those of the selection switches 37 which have been designated by the control circuit 43 are operable and the corresponding lamps 46 are turned on.

When the owner of the card inserted presses a desired one of the switches 37, the first stopper 26 is retracted so that the conveyor 8 carries the card farther inward. At the same time, the signal from the pressed switch is applied through the register 45 to the ticket issuing device 38, which issues a ticket in accordance with the signal. The ticket is then delivered out into the tray. At the same time, the signal stored in the register 45 is coded and applied to the subtraction circuit 48, which subtracts the value X of the ticket that has been purchased from the value of $ 5.5 that can be spent.

The resulting value ($ 5.5-X) is written by the writing head 27 on the magnetic stripe 2 of the card 1 and also printed by the dot printer 28 in the area 4 thereof, with one of the pins 36 of the second stopper 29 defining the line in the area 4 in which the figures expressing the value are to be printed.

The card the value of which has now been rewritten is conveyed by the belts 9, 9 and then 10, 10 onto the tray 11, with the detector 22 detecting the passing of the card to terminate the series of operations of the machine.

As described above, in accordance with the invention, the stored value of the card and the maximum spendable value are always compared by the comparing circuit, so that if the former value is less than the latter value, an article within the former value is vended, while if the latter value is less than the former value, an article within the latter value is vended. By the use of the stored value card which has an extra value added to the value of the money actually paid and which has a preset maximum value that can be spent at one time, it is possible to vend articles properly within the preset value, and without causing any undue economic loss to the owner of the vending machine.

What we claim are:

1. An automatic article vending apparatus, comprising:
    means for receiving a stored value card having recorded thereon a first monetary value corresponding to the remaining stored value of said card, said card also having recorded thereon a second monetary value which is less than said remaining stored value and corresponds to a predetermined monetary limit for a single purchase of articles from the apparatus by the customer;
    means for reading said first and second monetary values;
    means for entering into the apparatus a third monetary value corresponding to the value of an article selected by a customer;
    means for comparing said first and second monetary values and for providing a comparator output signal indicative of the lower value therebetween;
    means dispensing said selected article to the customer;
    control means responsive to said comparator output signal and operative to control said dispensing means such that it dispenses said selected article to the customer only when said third monetary value is no greater than the lower of said first and second monetary values;
    means for updating said first monetary value to substract said third monetary value; and,
    means returning said card to the customer.

2. The apparatus of claim 1, wherein said second monetary value is substantially less than said initial stored value.

3. The apparatus of claim 1, wherein said selected article is a transit ticket.

4. The apparatus of claim 1, wherein said first and second monetary values recorded on said card take the form of symbols which are machine-readable.

5. The apparatus of claim 4, wherein said first and second monetary values recorded on said card also take the form of symbols which are human-readable.

6. The apparatus of claim 1, wherein said initial stored value is equal to the value paid by the customer for said card.

7. The apparatus of claim 1, wherein said initial stored value is greater than the value paid by the customer for said card by a predetermined amount.

8. The apparatus of claim 1, wherein said entering means includes a plurality of selection switches adapted to be operated by the customer, the operation of each of said plurality of selection switches resulting in an associated third monetary value corresponding to the value of the article selected by the customer being entered into said apparatus, and wherein said control means includes means for rendering operable only those selected ones of said plurality of selection switches having associated third monetary values which are no greater than the lower of said first and second monetary values.

9. An apparatus of claim 8, wherein said control means includes means for impressing a voltage across said selected ones of said plurality of selection switches, said selected one thereby producing switch output signals, and further including an OR gate, responsive to said switch output signals to produce a control signal, and means applying said control signal to said article dispensing means.

10. An automatic article vending apparatus, comprising:
means receiving a stored value card having recorded thereon a first monetary value corresponding to the remaining stored value of said card and a second monetary value corresponding to a predetermined monetary limit for a single purchase by a customer from the apparatus;

means for reading and storing said first and second monetary values recorded on said card;

means for comparing said first and second monetary values;

means for selecting articles of different monetary value, including means for entering into the apparatus a third monetary value corresponding to the value of a selected article, said selecting means including a plurality of switches adapted to be operated by the customer, the operation of each switch resulting in an associated third monetary value being entered into the apparatus;

control means responsive to said comparing means for rendering operable only those of said switches having associated third monetary values which are no greater than the lower of said first and second monetary values;

means responsive to said control means for dispensing said selected articles to the customer;

means for subtracting said third monetary value from said first monetary value to obtain a modified first monetary value;

means for recording said modified first monetary value on said card as an updated remaining stored value, and means returning said card to the customer.

11. An apparatus of claim 10, wherein said first, second and third monetary values recorded on said card take the form of symbols which are in machine-readable form.

12. An apparatus of claim 10, wherein said first, second and third monetary values recorded on said card take the form of symbols which are in human-readable form.

* * * * *